(12) United States Patent
Tanaka et al.

(10) Patent No.: US 12,469,848 B2
(45) Date of Patent: Nov. 11, 2025

(54) NEGATIVE ELECTRODE FOR USE IN FLUORIDE ION SECONDARY BATTERY AND FLUORIDE ION SECONDARY BATTERY INCLUDING SAME

(71) Applicant: HONDA MOTOR CO., LTD., Tokyo (JP)

(72) Inventors: Akihisa Tanaka, Saitama (JP); Yoshiyuki Morita, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 183 days.

(21) Appl. No.: 17/584,356

(22) Filed: Jan. 25, 2022

(65) Prior Publication Data

US 2022/0238877 A1   Jul. 28, 2022

(30) Foreign Application Priority Data

Jan. 26, 2021 (JP) .................. 2021-010554

(51) Int. Cl.
   *H01M 4/58*   (2010.01)
   *H01M 4/02*   (2006.01)
   *H01M 10/054*   (2010.01)

(52) U.S. Cl.
   CPC ......... *H01M 4/582* (2013.01); *H01M 10/054* (2013.01); *H01M 2004/021* (2013.01); *H01M 2004/027* (2013.01)

(58) Field of Classification Search
   CPC ..... H01M 2004/021; H01M 2004/027; H01M 10/054; H01M 4/582
   See application file for complete search history.

(56) References Cited

U.S. PATENT DOCUMENTS

| | | |
|---|---|---|
| 5,320,917 A | 6/1994 | Takada et al. |
| 2013/0040203 A1 | 2/2013 | Yoon et al. |
| 2013/0048924 A1 | 2/2013 | Amatucci et al. |
| 2017/0062805 A1 | 3/2017 | Nakamoto et al. |
| 2018/0159129 A1 | 6/2018 | Ide |

(Continued)

FOREIGN PATENT DOCUMENTS

| | | |
|---|---|---|
| CN | 101467287 A | 6/2009 |
| CN | 110518192 A | 11/2019 |

(Continued)

OTHER PUBLICATIONS

Machine translation of RU 2686661 C1 (Year: 2019).*

(Continued)

*Primary Examiner* — Frank J Vineis
(74) *Attorney, Agent, or Firm* — CKC & Partners Co., LLC (57) ABSTRACT

Provided is a fluoride ion secondary battery having a capacity larger than that of a conventional one. The fluoride ion secondary battery has a negative electrode including zirconium fluoride as a negative electrode active material. The zirconium fluoride may be in the form of particles with an average particle size of 100 nm or less, and the negative electrode may have a zirconium fluoride content of less than 50 % by mass. The negative electrode active material may further include metallic zirconium, which may be in the form of particles with an average particle size of 75 μm or less. The negative electrode may have a metallic zirconium content of 8% by mass or less.

4 Claims, 6 Drawing Sheets

(56) References Cited

U.S. PATENT DOCUMENTS

| | | |
|---|---|---|
| 2018/0342763 A1 | 11/2018 | Miki |
| 2019/0140279 A1 | 5/2019 | Miki |
| 2019/0363361 A1 | 11/2019 | Asano et al. |
| 2020/0203761 A1 | 6/2020 | Ide |
| 2020/0381731 A1 | 12/2020 | Zhang et al. |
| 2021/0339315 A1* | 11/2021 | Matsunaga ............. B02C 17/16 |

FOREIGN PATENT DOCUMENTS

| | | |
|---|---|---|
| CN | 112042018 A | 12/2020 |
| JP | H04238815 A | 8/1992 |
| JP | 2013510409 A | 3/2013 |
| JP | 2017050113 A | 3/2017 |
| JP | 2018092863 A | 6/2018 |
| JP | 2018198130 A | 12/2018 |
| JP | 2018206755 A | 12/2018 |
| JP | 2019029206 A | 2/2019 |
| JP | 2019087403 A | 6/2019 |
| JP | 2020102393 A | 7/2020 |
| RU | 2686661 C1 * | 4/2019 |
| WO | 2007146453 A2 | 12/2007 |
| WO | WO-2020071335 A1 * | 4/2020 ............ B22F 1/0011 |
| WO | 2020240890 A1 | 12/2020 |

OTHER PUBLICATIONS

Office Action issued Jul. 31, 2024 in the CN Patent Application No. 202210094144.2.

Notification of Reasons for Refusal issued Oct. 1, 2024 in the JP Patent Application No. 2021-010554.

Office Action issued Mar. 25, 2025 in the CN Patent Application No. 202210094144.2.

* cited by examiner

FIG. 1

| | DENSITY [g/cc] | | IONIC CONDUCTIVITY [S/cm]@140°C |
|---|---|---|---|
| | LITERATURE VALUE | MEASURED VALUE | |
| $ZrF_4$ | 4.4 | 3.0 | $3.4 \times 10^{-9}$ |
| $AlF_3$ | 3.1 | 1.5 | UNMEASURABLE |

FIG. 2

CeBaFx+ AB : 750mg
($CeBaF_{2.95}$ : 700mg + AB :50mg)

← $ZrF_4$ (2μm or 65nm or 20nm) :250mg

400rpm, 15min, 40cyc

ZrFCB

FIG. 3

CeBaFx+ AB : 700mg
($CeBaF_{2.95}$ : 700mg + AB :50mg)

← $ZrF_4$ (20nm) : 250mg

← Zr (2μm) : 50mg

400rpm, 15min, 40cyc

ZrFCB

FIG. 4

ZrF$_4$ MICROPARTICLES
BEFORE BALL MILLING

FIG. 5

ZrF$_4$ MICROPARTICLES
AFTER BALL MILLING

FIG. 6

ZrF₄ NANOPARTICLES
AFTER BALL MILLING

NEGATIVE ELECTRODE FOR USE IN FLUORIDE ION SECONDARY BATTERY AND FLUORIDE ION SECONDARY BATTERY INCLUDING SAME

This application is based on and claims the benefit of priority from Japanese Patent Application No. 2021-010554, filed on 26 Jan. 2021, the content of which is incorporated herein by reference.

BACKGROUND OF THE INVENTION

Field of the Invention

The present invention relates to a negative electrode for use in a fluoride ion secondary battery and to a fluoride ion secondary battery including such a negative electrode.

Related Art

In the conventional art, fluoride ion secondary batteries are proposed using fluoride ions as carriers (see, for example, Patent Documents 1 to 6). Fluoride ion secondary batteries are expected to be superior in performance to lithium-ion secondary batteries, and have been studied in various ways in recent years.

For example, aluminum-based materials have been studied as candidates for the negative electrode active material in fluoride ion secondary batteries. In particular, aluminum fluoride has been studied for use in fluoride ion secondary batteries. Unfortunately, aluminum fluoride has a problem in that it is relatively less prone to electrochemical reactions due to its electrical insulating properties.

Patent Document 1: Japanese Unexamined Patent Application, Publication No. 2019-87403
Patent Document 2: Japanese Unexamined Patent Application, Publication No. 2017-50113
Patent Document 3: Japanese Unexamined Patent Application, Publication No. 2019-29206
Patent Document 4: Japanese Unexamined Patent Application, Publication No. 2018-206755
Patent Document 5: Japanese Unexamined Patent Application, Publication No. 2018-198130
Patent Document 6: Japanese Unexamined Patent Application, Publication No. 2018-92863

SUMMARY OF THE INVENTION

Thus, a fluoride ion secondary battery has been provided including, as a negative electrode active material, an aluminum fluoride material doped with lithium metal. At present, however, such a fluoride ion secondary battery is required to have further improved characteristics. Specifically, the lithium metal-doped aluminum fluoride active material has relatively low ionic conductivity, and the concentration of the negative electrode active material in the negative electrode cannot be increased sufficiently, which makes it not easy to provide a battery with a large capacity.

The present invention has been made in light of the circumstances mentioned above, and an object of the present invention is to provide a fluoride ion secondary battery having a capacity larger than that of the conventional one.

(1) An aspect of the present invention is to provide a negative electrode for use in a fluoride ion secondary battery, the negative electrode including a negative electrode active material including zirconium fluoride.

(2) In the negative electrode according to aspect (1) for use in a fluoride ion secondary battery, the zirconium fluoride may be in the form of particles with an average particle size of 100 nm or less.

(3) The negative electrode according to aspect (1) or (2) for use in a fluoride ion secondary battery may have a zirconium fluoride content of less than 50% by mass.

(4) In the negative electrode according to any one of aspects (1) to (3) for use in a fluoride ion secondary battery, the negative electrode active material may further include metallic zirconium.

(5) In the negative electrode according to aspect (4) for use in a fluoride ion secondary battery, the metallic zirconium may be in the form of particles with an average particle size of 75 µm or less.

(6) The negative electrode according to aspect (4) or (5) for use in a fluoride ion secondary battery may have a metallic zirconium content of 8% by mass or less.

(7) Another aspect of the present invention is to provide a fluoride ion secondary battery including the negative electrode according to any one of aspects (1) to (6).

The present invention makes it possible to provide a fluoride ion secondary battery having a capacity larger than that of the conventional one.

DETAILED DESCRIPTION OF THE INVENTION

Hereinafter, embodiments of the present invention will be described in detail with reference to the drawings.

Negative Electrode for Use in Fluoride Ion Secondary Battery

The negative electrode according to an embodiment of the present invention for use in a fluoride ion secondary battery includes zirconium fluoride as a negative electrode active material. A negative electrode including zirconium fluoride and being for use in a fluoride ion secondary battery has not been known so far. The negative electrode according to the embodiment for use in a fluoride ion secondary battery is characterized by including zirconium fluoride.

Zirconium fluoride functions as a negative electrode active material during charging and discharging. Specifically, zirconium fluoride releases fluoride ions $F^-$ during charging, and stores fluoride ions $F^-$ during discharging. Zirconium fluoride may be a commercially available product.

In an embodiment of the present invention, zirconium fluoride is preferably in the form of particles with an average particle size of 100 nm or less, and specifically, zirconium fluoride is preferably in the form of nanoparticles with an average particle size of 100 nm or less. The negative electrode active material including zirconium fluoride in the form of nanoparticles with an average particle size of 100 nm or less can form a battery with an increased capacity. More preferably, zirconium fluoride is in the form of particles with an average particle size of 65 nm or less.

In an embodiment of the present invention, the negative electrode for use in a fluoride ion secondary battery preferably has a zirconium fluoride content of less than 50% by mass. The charging capacity may increase with increasing zirconium fluoride concentration of the negative electrode for use in a fluoride ion secondary battery. However, if the zirconium fluoride concentration of the negative electrode for use in a fluoride ion secondary battery reaches 50% by mass, the charging capacity may sharply decrease due to a voltage drop caused by an increase in the internal resistance of the negative electrode, which may make it difficult to perform charging and discharging. More preferably, the zirconium fluoride content is 40% by mass or less.

Figure 1:
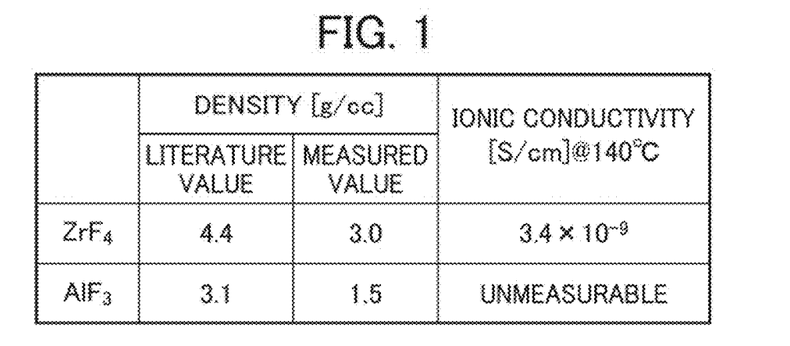
FIG. 1 is a view showing the properties of aluminum fluoride and zirconium fluoride.

In this regard, FIG. 1 is a view showing the properties of aluminum fluoride and zirconium fluoride. FIG. 1 shows the literature values (theoretical values) and the measured values of the densities of aluminum fluoride $AlF_3$, which has been studied in the conventional art, and zirconium fluoride $ZrF_4$ according to the embodiment. FIG. 1 also shows their ionic conductivities at 140° C. where fluoride ion secondary batteries are assumed to be operated.

The data in FIG. 1 indicates that zirconium fluoride can be more densified than the conventional aluminum fluoride and can also have a higher ionic conductivity. Therefore, zirconium fluoride can be used at a higher concentration than aluminum fluoride and can form a battery with a larger capacity. Moreover, the increase in the volume of zirconium fluoride with increasing concentration can be kept relatively low, which will make it possible to increase the content of a solid electrolyte including a fluoride ion-conducting fluoride material as described later and to increase the content of a conductive aid, so that higher ionic conductivity can be achieved.

In an embodiment of the present invention, the negative electrode active material preferably further includes metallic zirconium. The use of the negative electrode active material further including metallic zirconium makes it possible to improve the coulombic efficiency, which is the ratio of discharging capacity to charging capacity, and to improve the reversibility of charging and discharging. Metallic zirconium may be a commercially available product.

Specifically, the negative electrode according to the embodiment for use in a fluoride ion secondary battery preferably includes a solid electrolyte including a fluoride ion-conducting fluoride material as described later. In this case, if the solid electrolyte undergoes a certain reaction, the discharging capacity may be at an insufficient level relative to the charging capacity level. To address this problem, metallic zirconium can be added according to the embodiment to prevent the solid electrolyte from undergoing such a reaction, which will result in a high charging capacity and thus result in an improvement in the reversibility of charging and discharging. Moreover, metallic zirconium can work for discharging with a small loss of charging capacity, which can be expected to result in an increase in the lifetime of the fluoride ion secondary battery according to an embodiment of the present invention.

The metallic zirconium is preferably in the form of particles with an average particle size of 75 μm or less. In other words, the metallic zirconium preferably forms particles with an average particle size of 75 μm or less. The addition of metallic zirconium in the form of particles with an average particle size of 75 μm or less makes it possible to provide a battery with increased capacity and improved reversibility of charging and discharging.

The negative electrode according to the embodiment for use in a fluoride ion secondary battery preferably has a metallic zirconium content of 8% by mass or less. As the metallic zirconium content of the negative electrode for use in a fluoride ion secondary battery is increased, the coulombic efficiency may increase, but the amount of the electrolyte may decrease so that the internal resistance of the negative electrode may increase and the voltage may decrease, which may result in a decrease in charging capacity. However, when the negative electrode for use in a fluoride ion secondary battery has a metallic zirconium content of 8% by mass or less, such a decrease in charging capacity can be prevented. More preferably, the metallic zirconium content is 5% by mass or less.

The negative electrode according to the embodiment for use in a fluoride ion secondary battery preferably further includes a fluoride ion-conducting fluoride solid electrolyte and a conductive aid in addition to the zirconium fluoride and the metallic zirconium as negative electrode active materials.

The fluoride ion-conducting fluoride may be any fluoride having fluoride ion conductivity. Examples of the fluoride ion-conducting fluoride include $CeBaF_x$ and $BaLaF_y$, such as $Ce_{0.95}Ba_{0.05}F_{2.95}$ and $Ba_{0.6}La_{0.4}F_{2.4}$. When containing such a fluoride ion-conducting fluoride, the negative electrode according to the embodiment for use in a fluoride ion secondary battery can have improved fluoride ion conductivity.

The fluoride ion-conducting fluoride is preferably in the form of particles with an average particle size in the range of 0.1 μm to 100 μm. The fluoride ion-conducting fluoride in the form of particles with an average particle size in such a range can form an electrode thin layer having relatively high ionic conductivity. More preferably, the fluoride ion-conducting fluoride is in the form of particles with an average particle size in the range of 0.1 μm, to 10 μm.

The conductive aid may be any type having electron conductivity. For example, the conductive aid may be carbon black or the like. The carbon black may be furnace black, Ketjen black, or acetylene black. When containing such a conductive aid, the negative electrode according to the embodiment for use in a fluoride ion secondary battery can have improved electron conductivity.

The conductive aid is preferably in the form of particles with an average particle size in the range of 20 nm to 50 nm. The conductive aid in the form of particles with an average particle size in such a range can form a lightweight electrode having high electron conductivity.

The negative electrode according to the embodiment for use in a fluoride ion secondary battery may further include additional components, such as a binder, as long as such components do not impair the advantageous effects of the embodiment.

Figure 2:
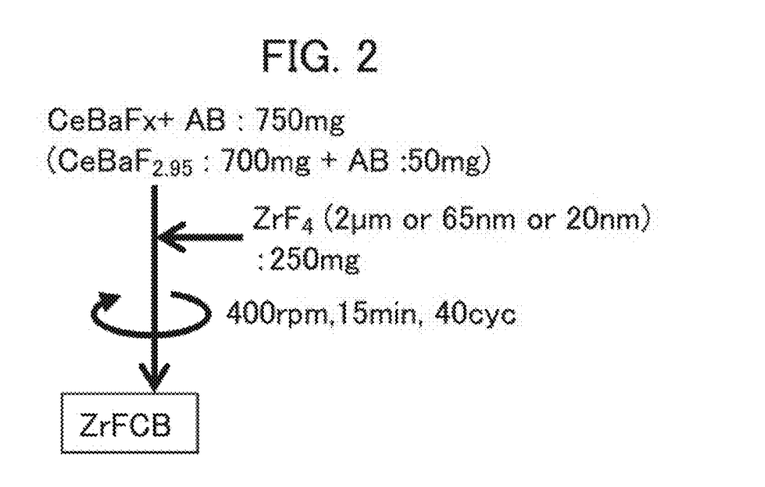
FIG. 2 is a diagram showing an exemplary method for producing a negative electrode according to an embodiment of the present invention for use in a fluoride ion secondary battery.
Figure 3:
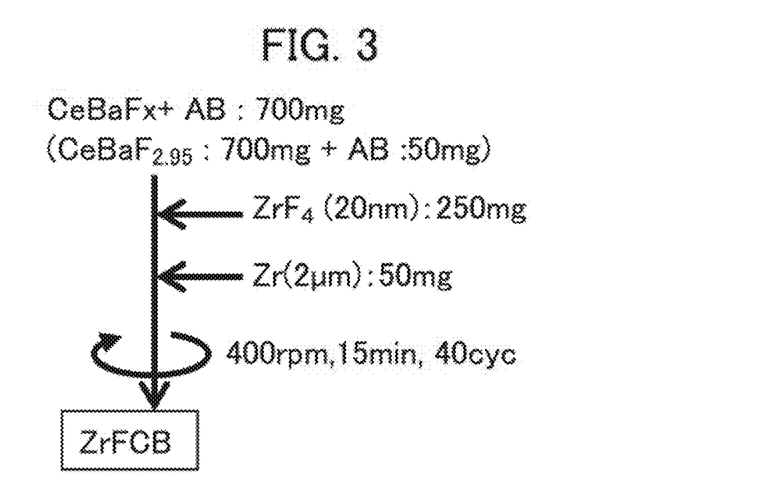
FIG. 3 is a diagram showing another exemplary method for producing the negative electrode according to the embodiment for use in a fluoride ion secondary battery.

Next, methods for producing the negative electrode according to the embodiment for use in a fluoride ion secondary battery will be described in detail with reference to FIGS. 2 and 3. FIG. 2 is a diagram showing an exemplary method for producing the negative electrode according to the embodiment for use in a fluoride ion secondary battery. FIG. 3 is a diagram showing another exemplary method for producing the negative electrode according to the embodiment for use in a fluoride ion secondary battery.

In the exemplary production method shown in FIG. 2, first, a mixture is prepared of 700 mg of $CeBaF_x$, ($Ce_{0.95}Ba_{0.05}F_{2.95}$), which is a fluoride ion-conducting fluoride solid electrolyte, and 50 mg of carbon black (acetylene black AB), which is a conductive aid.

Subsequently, 250 mg of zirconium fluoride $ZrF_4$ is added to the mixture, and then the resulting mixture is subjected to, for example, 40 cycles of ball milling at 400 rpm for 15 minutes. As a result, a material mixture ZrFCB is obtained which is for the negative electrode according to the embodiment for use in a fluoride ion secondary battery. The resulting material mixture ZrFCB and a negative electrode current collector, such as a gold foil, are then integrated by pressing at a predetermined pressure to form a negative electrode according to the embodiment for use in a fluoride ion secondary battery.

In this process, zirconium fluoride and the fluoride ion-conducting fluoride may be mixed in any selected ratio. As mentioned above, the negative electrode for use in a fluoride ion secondary battery preferably has a zirconium fluoride content of less than 50% by mass. For an increase in charging capacity, the fluoride ion-conducting fluoride as a source of fluorine is preferably mixed in a higher ratio.

The zirconium fluoride to be added is preferably in the form of particles having an average particle size selected such that the zirconium fluoride will be in the form of nanoparticles with an average particle size of 100 nm or less after being subjected to ball milling. For example, the zirconium fluoride may be added in the form of microparticles with an average particle size of 100 μm and then pulverized by ball milling.

Figure 4:
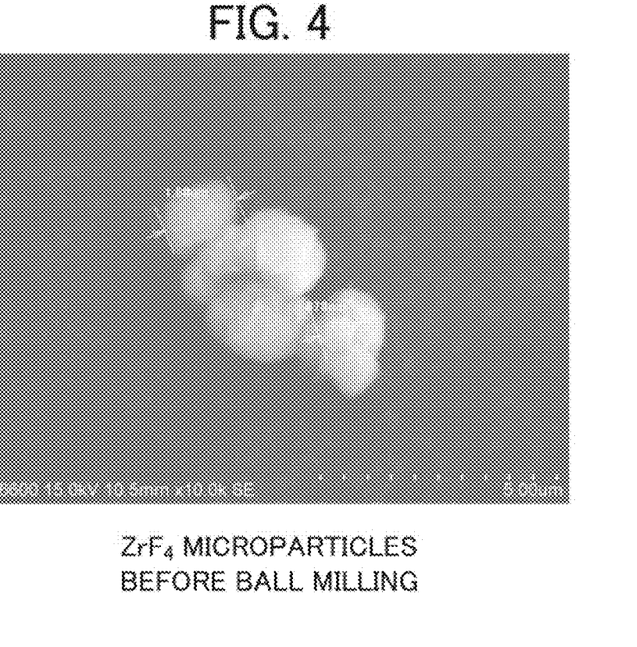
FIG. 4 is an electron micrograph of zirconium fluoride in the form of microparticles to be subjected to ball milling.
Figure 5:
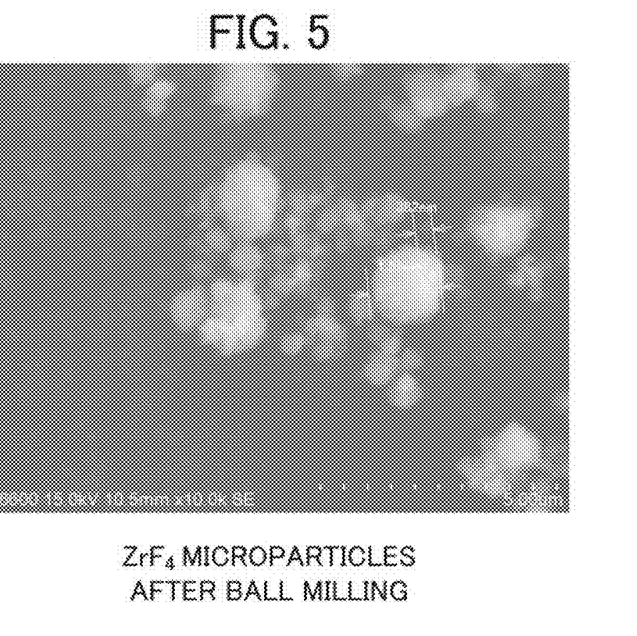
FIG. 5 is an electron micrograph of zirconium fluoride in the form of microparticles resulting from ball milling.

FIG. 4 is an electron micrograph of zirconium fluoride in the form of microparticles to be subjected to ball milling. FIG. 5 is an electron micrograph of zirconium fluoride in the form of microparticles resulting from ball milling. FIGS. 4 and 5 show that even after the ball milling, the zirconium fluoride may remain in the form of microparticles although the ball milling can reduce the minimum particle size to about 300 nm.

Figure 6:
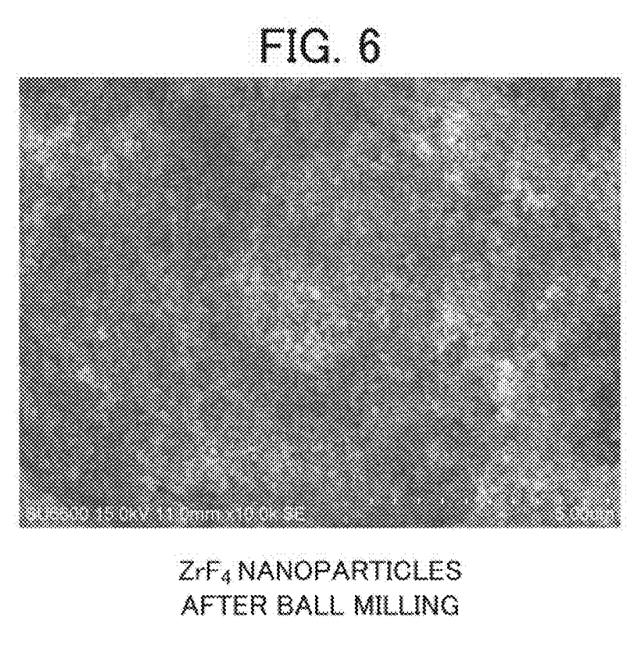
FIG. 6 is an electron micrograph of zirconium fluoride in the form of nanoparticles resulting from ball milling.

FIG. 6 is an electron micrograph of zirconium fluoride in the form of nanoparticles resulting from ball milling. FIG. 6 shows that the average particle size remains almost unchanged after the ball milling when zirconium fluoride is added in the form of particles with an average particle size of 65 nm or 20 nm as shown in FIG. 2. Namely, zirconium fluoride in the form of particles with an average particle size of 65 nm or 20 nm can remain unchanged in particle size.

Referring back to FIG. 3, which shows another production method, a mixture is first prepared of 700 mg of $CeBaF_x$ ($Ce_{0.95}Ba_{0.05}F_{2.95}$), which is a fluoride ion-conducting fluoride solid electrolyte, and 50 mg of carbon black (acetylene black AB), which is a conductive aid, as in the example shown in FIG. 2.

Subsequently, 250 mg of zirconium fluoride $ZrF_4$ in the form of particles, for example, with an average particle size of 20 nm and 50 mg of metallic zirconium Zr in the form of particles, for example, with an average particle size of 2 μm are added to the mixture. The resulting mixture is then subjected to, for example, 40 cycles of ball milling at 400 rpm for 15 minutes. As a result, a material mixture ZrFCB is obtained which is for the negative electrode according to the embodiment for use in a fluoride ion secondary battery. The resulting material mixture ZrFCB and a negative electrode current collector, such as a gold foil, are then integrated by pressing at a predetermined pressure to form a negative electrode according to the embodiment for use in a fluoride ion secondary battery.

The negative electrode according to the embodiment described above for use in a fluoride ion secondary battery has advantageous effects as shown below.

The negative electrode according to the embodiment for use in a fluoride ion secondary battery includes zirconium fluoride as a negative electrode active material. As shown above, zirconium fluoride can be more densified than aluminum fluoride according to the conventional art and can have a higher ionic conductivity. Therefore, zirconium fluoride can be used at a higher concentration than aluminum fluoride according to the conventional art and can form a battery with a larger capacity. Moreover, the increase in the volume of zirconium fluoride with increasing concentration can be kept relatively low, which will make it possible to increase the content of a solid electrolyte including a fluoride ion-conducting fluoride and to increase the content of a conductive aid, so that higher ionic conductivity can be achieved.

As mentioned above, a fluoride ion secondary battery has been provided including, as a negative electrode active material, an aluminum fluoride material doped with lithium metal. At present, however, such a fluoride ion secondary battery is required to have further improved characteristics. Specifically, the lithium metal-doped aluminum fluoride active material has relatively low ionic conductivity, and the content of the negative electrode active material in the negative electrode cannot be increased sufficiently. Such a battery cannot have a high capacity density (capacity per mass of the battery) and has a coulombic efficiency as low as about 50% at the first charge/discharge cycle. To address this problem, the negative electrode according to the embodiment for use in a fluoride ion secondary battery may further include metallic zirconium as another negative electrode active material in addition to zirconium fluoride. The use of metallic zirconium as an additional negative electrode active material makes it possible to remarkably increase the coulombic efficiency, which is the ratio of discharging capacity to charging capacity, and to remarkably improve the reversibility of charging and discharging.

Fluoride Ion Secondary Battery

The fluoride ion secondary battery according to an embodiment of the present invention includes the negative electrode described above. The fluoride ion secondary battery according to the embodiment also includes a solid electrolyte layer including a fluoride ion-conducting solid electrolyte; and a positive electrode.

The solid electrolyte as a component of the solid electrolyte layer may be a conventionally known solid electrolyte. Specifically, the solid electrolyte may be a fluoride ion-conducting fluoride as described above.

The positive electrode may include a conventionally known positive electrode active material. The positive electrode preferably has a standard electrode potential sufficiently higher than that of the negative electrode according to the embodiment. A fluoride ion-free material may be selected as a positive electrode material to form a battery that can be charged at the start. In this case, the battery can be produced in a discharged state at a low energy level with improved stability of the active material in the electrode.

Examples of the positive electrode material include Pb, Cu, Sn, Bi, Ag, a conductive aid, and a binder. For example, a positive electrode material mixture including lead fluoride or tin fluoride and carbon black may be integrated with a positive electrode material for serving as a current collector, such as a lead foil, by pressing at a predetermined pressure to form a positive electrode.

Thus, the negative electrode according to the embodiment, the solid electrolyte layer, and the positive electrode may be stacked in order to form the fluoride ion secondary battery according to the embodiment. The fluoride ion secondary battery according to the embodiment can produce the same advantageous effects as shown for the negative electrode according to the embodiment described above.

The embodiments described above are not intended to limit the present invention and may be altered or modified within the scope of the invention where the objects of the present invention can be achieved. For example, while embodiments in which the present invention is applied to solid-state batteries have been described, such embodiments are not intended to limit the battery type. The present invention may also be applied to fluoride ion secondary batteries including an electrolytic solution in place of the solid electrolyte layer.

EXAMPLES

Next, examples of the present invention will be described, which are not intended to limit the scope of the present invention.

Examples 1 to 3

In each of Examples 1 to 3, a negative electrode material powder for use in a fluoride ion secondary battery was prepared according to the method shown in FIG. 2 for producing the negative electrode according to the embodiment. Zirconium fluoride in the form of particles with average particles sizes of 65 nm, 20 nm, and 2 µm was used in Examples 1, 2, and 3, respectively. In all of Examples 1 to 3, the content of zirconium fluoride in the negative electrode for use in a fluoride ion secondary battery was 25% by mass.

Examples 4 to 7

In each of Examples 4 to 7, a negative electrode material powder for use in a fluoride ion secondary battery was prepared according to the method shown in FIG. 2 for producing the negative electrode according to the embodiment. Zirconium fluoride in the form of particles with an average particles size of 65 nm was used in all of Examples 4 to 7. The content of zirconium fluoride in the negative electrode for use in a fluoride ion secondary battery was 12.5% by mass in Example 4, 30% by mass in Example 5, 40% by mass in Example 6, and 50% by mass in Example 7.

Examples 8 to 10

In each of Examples 8 to 10, a negative electrode for use in a fluoride ion secondary battery was prepared according to the method shown in FIG. 3 for producing the negative electrode according to the embodiment. Metallic zirconium in the form of particles with an average particle size of 2 µm was used in all of Examples 8 to 10. The content of metallic zirconium in the negative electrode for use in a fluoride ion secondary battery was 8% by mass in Example 8, 1% by mass in Example 9, and 5% by mass in Example 10.

Comparative Examples 1 and 2

In each of Comparative Examples 1 and 2, a negative electrode for use in a fluoride ion secondary battery was prepared using a modified $AlF_3$ negative electrode active material, which is a lithium metal-doped aluminum fluoride material as disclosed in PCT/JP2019/039886, by the production method disclosed in PCT/JP2019/039886. Modified $AlF_3$ in the form of particles with an average particle size on the order of nanometers was used in all of Comparative Examples 1 and 2. The content of the modified $AlF_3$ in the negative electrode for use in a fluoride ion secondary battery was 12.5% by mass in Comparative Example 1 and 25% by mass in Comparative Example 2.

Charge and Discharge Test

The negative electrode prepared in each of the examples was used to form a half cell. The resulting half cells were subjected to a charge and discharge test at a constant current. Specifically, the charge and discharge test at a constant current was carried out in a vacuum environment at 140° C. at a charging current of 0.04 mA and a discharging current of 0.02 mA with a lower limit voltage of −2.2 V and an upper limit voltage of −0.1 V using a potentio-galvanostat system (SI 1287/1255B manufactured by Solartron). The test was started from the application of the charging current.

Each half cell was prepared in the form of a cylindrical columnar pellet cell by press-molding the materials at a pressure of 40 MPa in a tablet molding machine. Specifically, a gold foil (99.99%, 10 µm in thickness, manufactured by The Nilaco Corporation) as a negative electrode current collector, 10 mg of the negative electrode material mixture powder prepared in each of the examples, 200 mg of a solid electrolyte, 30 mg of a positive electrode material mixture powder, and a gold foil (99.99%, 20 µm in thickness, manufactured by the Nilaco Corporation) serving as a positive electrode material and a positive electrode current collector were placed in order in the tablet molding machine and then press-molded to form a half cell.

Results and Discussion

Figure 7:
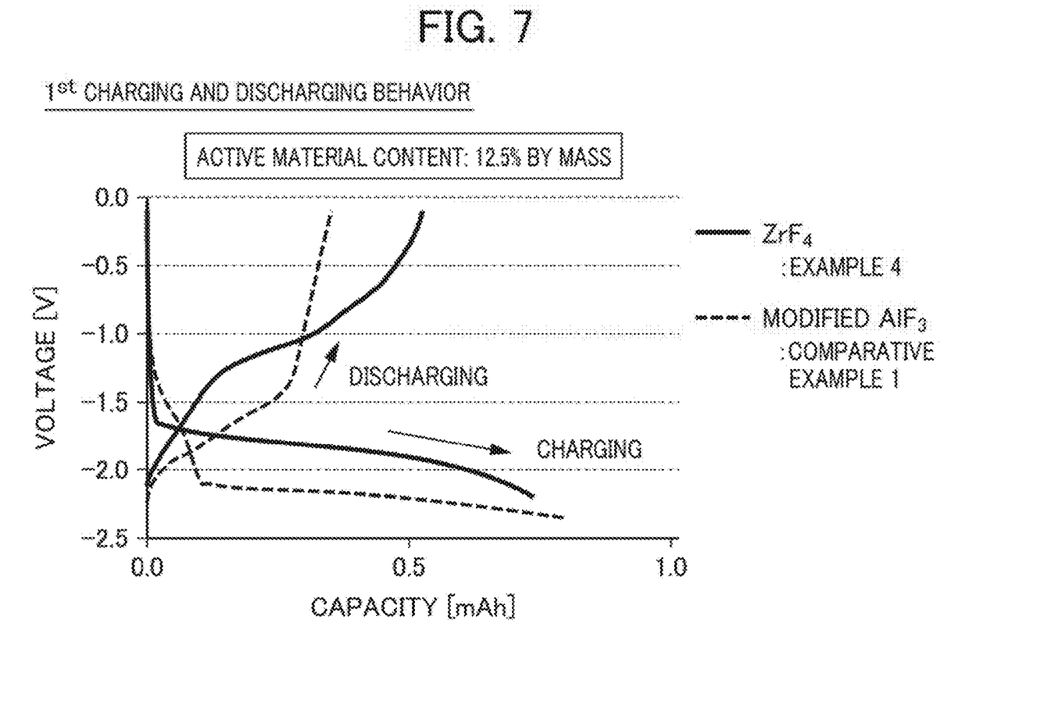
FIG. 7 is a graph showing the charging and discharging curves of the negative electrode half cells of Example 4 and Comparative Example 1 for fluoride ion secondary batteries.

FIG. 7 is a graph showing the charging and discharging curves of the negative electrode half cells of Example 4 and Comparative Example 1 for fluoride ion secondary batteries. FIG. 7 shows that the half cell of Example 4 having the negative electrode containing 12.5% by mass of zirconium fluoride $ZrF_4$ as a negative electrode active material has a high ratio of discharging capacity to charging capacity (a high coulombic efficiency) and improved reversibility of charging and discharging as compared to the half cell of Comparative Example 1 having the negative electrode containing 12.5% by mass of modified $AlF_3$.

Figure 8:
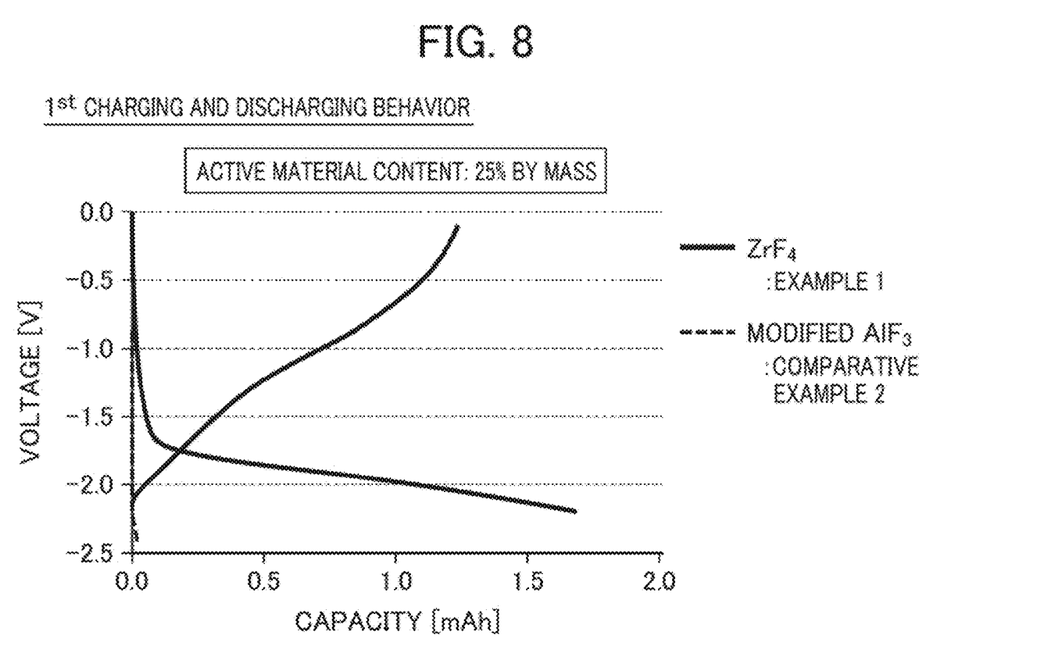
FIG. 8 is a graph showing the charging and discharging curves of the negative electrode half cells of Example 1 and Comparative Example 2 for fluoride ion secondary batteries.

FIG. 8 is a graph showing the charging and discharging curves of the negative electrode half cells of Example 1 and Comparative Example 2 for fluoride ion secondary batteries. FIG. 8 shows that the half cell of Example 1 having the negative electrode containing 25% by mass of zirconium fluoride $ZrF_4$ as a negative electrode active material has a large capacity and shows a utilization rate of 1001 as compared to the half cell of Comparative Example 2 having the negative electrode containing 25% by mass of modified $AlF_3$, which showed almost no capacity.

Figure 9:
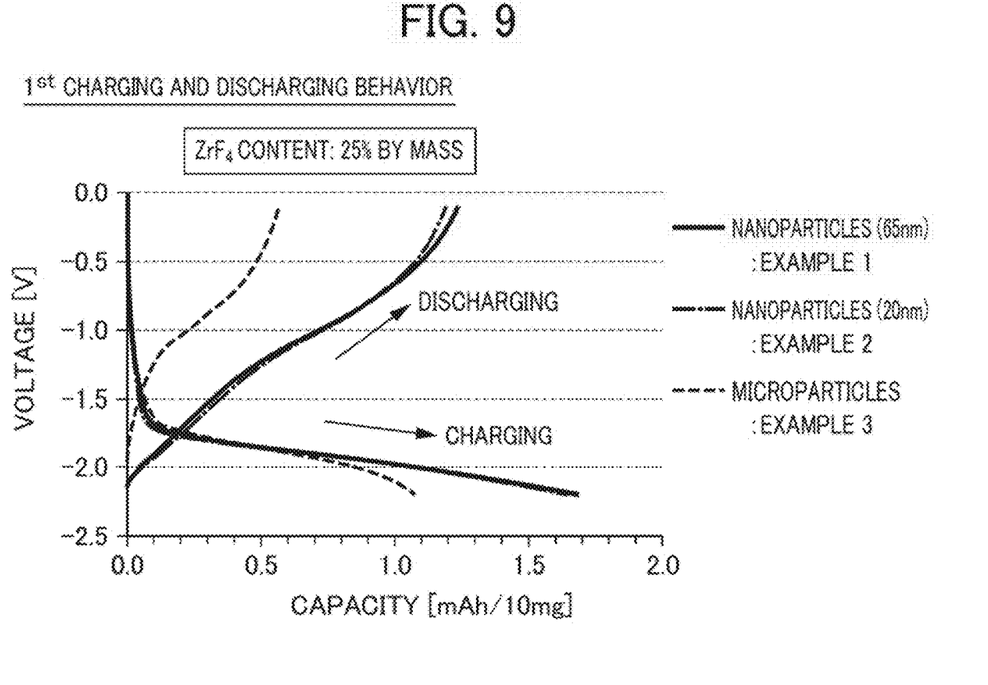
FIG. 9 is a graph showing the charging and discharging curves of the negative electrode half cells of Examples 1 to 3 for fluoride ion secondary batteries.

FIG. 9 is a graph showing the charging and discharging curves of the negative electrode half cells of Examples 1 to 3 for fluoride ion secondary batteries. In this case, the actually available capacity is expressed by the utilization rate relative to the theoretical capacity. While zirconium fluoride at a concentration of 25% by mass provides a theoretical capacity of 1.6 mAh, FIG. 9 shows that microparticles of zirconium fluoride with an average particle size of 100 μm (the particle size was smaller after the ball milling) in Example 3 provide a capacity of about 1.1 mAh. Nanoparticles of zirconium fluoride with an average particle size of 65 nm in Example 1 and nanoparticles of zirconium fluoride with an average particle size of 20 nm in Example 2 all provide a capacity of about 1.6 mAh. This result shows that the nanoparticles provide a higher utilization rate than the microparticles.

Figure 10:
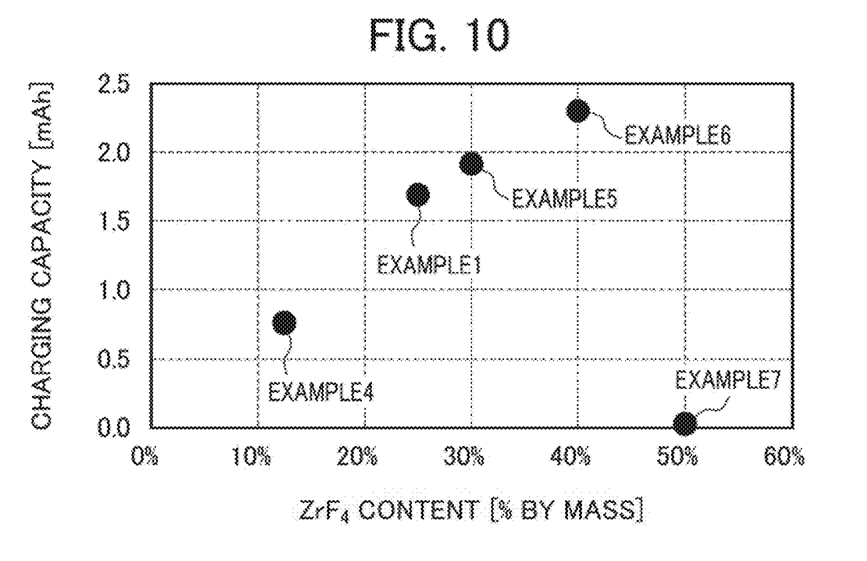
FIG. 10 is a graph showing the relationship between the capacity and the zirconium fluoride concentration of the negative electrode half cells of Examples 1 and 4 to 6 for fluoride ion secondary batteries.

FIG. 10 is a graph showing the relationship between the capacity and the zirconium fluoride concentration of the negative electrode half cells of Examples 1 and 4 to 7 for fluoride ion secondary batteries. FIG. 10 indicates that the charging capacity increases with increasing zirconium fluoride concentration of the negative electrode for a fluoride ion secondary battery and that when the zirconium fluoride concentration of the negative electrode reaches 50% by mass, the charging capacity sharply decreases due to a voltage drop caused by an increase in the internal resistance of the negative electrode, which makes it difficult to perform charging and discharging. This result suggests that the negative electrode for use in a fluoride ion secondary battery should preferably have a zirconium fluoride concentration of less than 50% by mass, more preferably 40% by mass or less.

Figure 11:
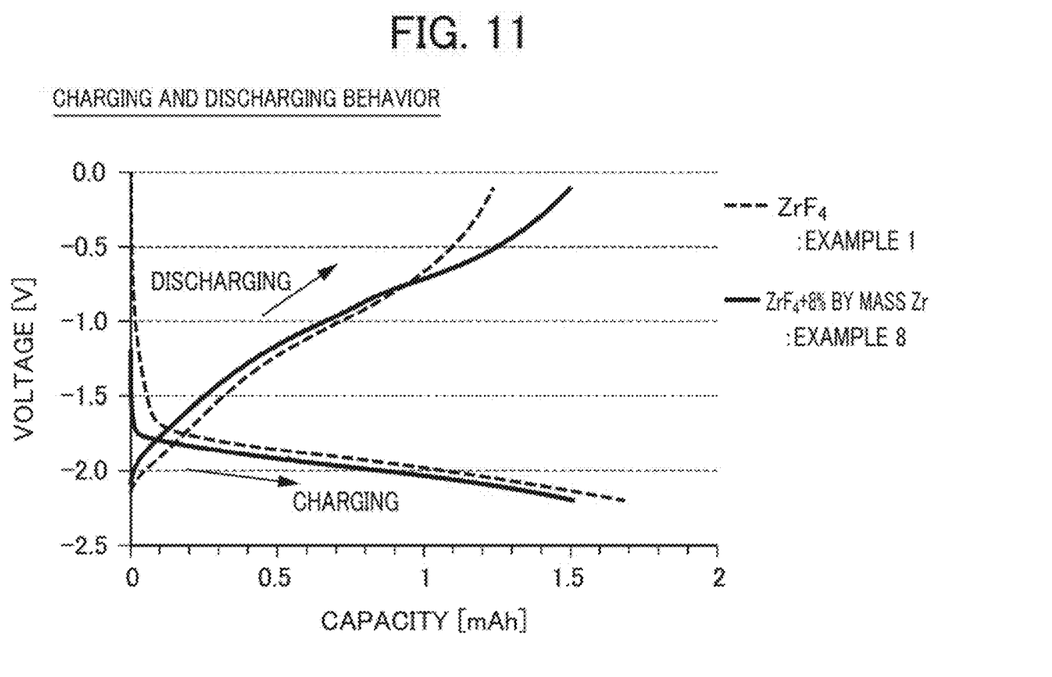
FIG. 11 is a graph showing the charging and discharging curves of the negative electrode half cells of Examples 1 and 8 for fluoride ion secondary batteries.

FIG. 11 is a graph showing the charging and discharging curves of the negative electrode half cells of Examples 1 and 8 for fluoride ion secondary batteries. FIG. 11 indicates that the half cell of Example 8 containing a negative electrode active material including zirconium fluoride and 8% by mass of metallic zirconium based on the mass of the negative electrode has a larger discharging capacity and improved reversibility of charging and discharging as compared to the half cell of Example 1 containing only zirconium fluoride as a negative electrode active material.

Figure 12:
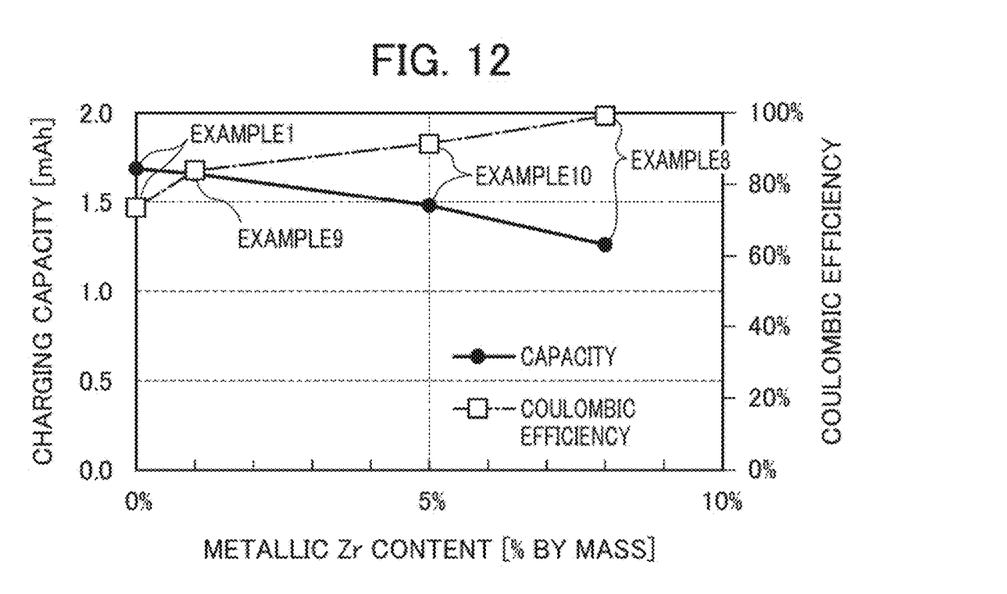
FIG. 12 is a graph showing the relationship between the coulombic efficiency, the capacity, and the zirconium fluoride concentration of the negative electrode half cells of Examples 1 and 8 to 10 for fluoride ion secondary batteries.

FIG. 12 is a graph showing the relationship between the coulombic efficiency, the capacity, and the zirconium fluoride concentration of the negative electrode half cells of Examples 1 and 8 to 10 for fluoride ion secondary batteries. FIG. 12 indicates that as the metallic zirconium concentration of the negative electrode increases, the coulombic efficiency increases from about 80% or more to near 100% while the charging capacity decreases gradually. This is because as the metallic zirconium concentration increases, the amount of the electrolyte decreases so that the internal resistance of the electrode increases to reduce the voltage. The results suggest that the metallic zirconium concentration of the negative electrode for use in a fluoride ion secondary battery should be 8% by mass or less so that an improved coulombic efficiency can be provided while the reduction in charging capacity is kept low.

What is claimed is:

1. A negative electrode for use in a fluoride ion secondary battery using fluoride ions as carriers,
    the negative electrode comprising a negative electrode active material comprising zirconium fluoride and metallic zirconium,
    wherein the zirconium fluoride has an average particle size of 100 nm or less,
    the metallic zirconium has an average particle size of 2 μm or more and 75 μm or less, and
    the negative electrode for use in a fluoride ion secondary battery has a zirconium fluoride content of less than 50% by mass and a metallic zirconium content of 8% by mass or less.

2. A fluoride ion secondary battery comprising the negative electrode according to claim 1.

3. A negative electrode for use in a fluoride ion secondary battery using fluoride ions as carriers,
    the negative electrode comprising a negative electrode active material comprising zirconium fluoride and metallic zirconium,
    the negative electrode for use in a fluoride ion secondary battery having a zirconium fluoride content of less than 50% by mass and a metallic zirconium content of 8% by mass or less.

4. A fluoride ion secondary battery, having the negative electrode for use in a fluoride ion secondary battery according to claim 3.

* * * * *